(12) United States Patent
Shibayama et al.

(10) Patent No.: US 8,913,098 B2
(45) Date of Patent: Dec. 16, 2014

(54) OPTICAL SCANNING DEVICE AND IMAGE FORMING APPARATUS

(75) Inventors: Yasuyuki Shibayama, Kanagawa (JP); Daisuke Ichii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/212,620

(22) Filed: Aug. 18, 2011

(65) Prior Publication Data

US 2012/0044315 A1 Feb. 23, 2012

(30) Foreign Application Priority Data

Aug. 19, 2010 (JP) ................... 2010-184151

(51) Int. Cl.
*B41J 2/45* (2006.01)
*B41J 2/455* (2006.01)
*G02B 26/12* (2006.01)
*B41J 2/47* (2006.01)

(52) U.S. Cl.
CPC ............... *G02B 26/124* (2013.01); *B41J 2/473* (2013.01); *G02B 26/125* (2013.01); *G02B 26/127* (2013.01)
USPC ........... 347/244; 347/137; 347/243; 347/259; 347/261; 359/204.1; 359/212.2; 359/216.1; 359/217.1

(58) Field of Classification Search
CPC .............. G02B 26/123; G02B 26/124; G02B 27/0031; G02B 26/12; G02B 27/0966; B41J 2/473; B41J 2/471; B41J 2/45; B41J 2/455
USPC .......................... 347/137, 243, 244, 259, 261; 359/204.1, 212.2, 216.1, 217.1
See application file for complete search history.

(56) References Cited

U.S. PATENT DOCUMENTS 4,850,663 A * 7/1989 Yamamoto et al. ........ 359/218.1
5,815,301 A * 9/1998 Naiki et al. ................ 359/205.1

(Continued)

FOREIGN PATENT DOCUMENTS

JP 62-240921 A 10/1987
JP 4-101112 4/1992

(Continued)

OTHER PUBLICATIONS

Machine translation of JP 2009-210760 A (published Sep. 17, 2009).*

(Continued)

*Primary Examiner* — Justin Seo
*Assistant Examiner* — Kendrick Liu
(74) *Attorney, Agent, or Firm* — Oblon, Spivak, McClelland, Maier & Neustadt, L.L.P.

(57) ABSTRACT

An optical scanning device includes a pre-deflection optical system including a first optical element that adjusts the shape of beams emitted from the light source; and a second and third optical elements arranged such that the second optical element is arranged closer to the light source than the third optical element is. Both of the second and third optical elements have no refracting power in the deflection scanning direction and have positive refracting power only in a direction perpendicular to the deflection scanning direction. An interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction.

16 Claims, 12 Drawing Sheets

(56) References Cited

U.S. PATENT DOCUMENTS

| | | |
|---|---|---|
| 6,509,995 B1 | 1/2003 | Suzuki et al. |
| 6,606,179 B2 | 8/2003 | Suzuki et al. |
| 6,801,351 B2 | 10/2004 | Suzuki et al. |
| 7,218,432 B2 | 5/2007 | Ichii et al. |
| 7,417,777 B2 | 8/2008 | Saisho et al. |
| 7,443,558 B2 | 10/2008 | Sakai et al. |
| 7,545,547 B2 | 6/2009 | Hayashi et al. |
| 7,586,661 B2 | 9/2009 | Ichii |
| 7,623,280 B2 | 11/2009 | Hirakawa et al. |
| 7,626,744 B2 | 12/2009 | Arai et al. |
| 7,663,657 B2 | 2/2010 | Ichii et al. |
| 7,672,032 B2 | 3/2010 | Hayashi et al. |
| 7,687,762 B2 | 3/2010 | Watanabe et al. |
| 7,738,007 B2 | 6/2010 | Ichii et al. |
| 7,800,805 B2 | 9/2010 | Hayashi et al. |
| 7,903,135 B2 | 3/2011 | Ichii et al. |
| 7,924,487 B2 | 4/2011 | Miyatake et al. |
| 7,940,292 B2 | 5/2011 | Hayashi et al. |
| 7,956,884 B2 | 6/2011 | Ichii |
| 7,969,460 B2 | 6/2011 | Akatsu et al. |
| 7,973,990 B2 | 7/2011 | Sakai et al. |
| 2007/0211325 A1 | 9/2007 | Ichii |
| 2007/0253047 A1 | 11/2007 | Ichii et al. |
| 2008/0055672 A1 | 3/2008 | Watanabe et al. |
| 2008/0068690 A1* | 3/2008 | Ichii ............................ 359/204 |
| 2008/0123159 A1 | 5/2008 | Hayashi et al. |
| 2008/0212999 A1 | 9/2008 | Masuda et al. |
| 2008/0219601 A1* | 9/2008 | Arai et al. ..................... 382/321 |
| 2009/0175657 A1 | 7/2009 | Yoshii et al. |
| 2009/0195849 A1 | 8/2009 | Ichii et al. |
| 2010/0060712 A1 | 3/2010 | Sato et al. |
| 2010/0195681 A1 | 8/2010 | Tatsuno et al. |
| 2010/0214633 A1 | 8/2010 | Sato et al. |
| 2010/0315477 A1 | 12/2010 | Shibayama |
| 2011/0141217 A1 | 6/2011 | Ichii |
| 2011/0221856 A1 | 9/2011 | Shibayama |

FOREIGN PATENT DOCUMENTS

| | | |
|---|---|---|
| JP | 8-15625 | 1/1996 |
| JP | 3448137 | 7/2003 |
| JP | 3483129 | 10/2003 |
| JP | 2008-76712 | 4/2008 |
| JP | 2008-96957 A | 4/2008 |
| JP | 2008-216908 | 9/2008 |
| JP | 2009-210760 A | 9/2009 |
| JP | 2009210760 A * | 9/2009 |

OTHER PUBLICATIONS

Office Action issued Apr. 22, 2014 in Japanese Patent Application No. 2010-184151.

* cited by examiner

FIG.2A

| NAME | SHAPE | MATERIAL | PRINCIPAL: RADIUS OF CURVATURE | SECONDARY: RADIUS OF CURVATURE | PLANE INTERVAL | FOCAL LENGTH | SYNTHESIZED FOCAL LENGTH |
|---|---|---|---|---|---|---|---|
| COUPLING LENS PLANE OF INCIDENCE | FLAT | BSC7 | ∞ | ∞ | 5.0 | 41.143 | 45.000 |
| PLANE OF EMISSION | SPHERICAL | - | -21.03 | -21.03 | 12.0 | | |
| TEMPERATURE CORRECTION LENS PLANE OF INCIDENCE | FLAT | ZeonexE48R | ∞ | ∞ | 2.0 | -324.475 | |
| PLANE OF EMISSION | PRINCIPAL: NON-CIRCULAR SECONDARY: SYMMETRIC CURVED TOROIDAL | - | 170 | 170 | - | | |

| NAME | MAIN-SCANNING DIAMETER | SUB-SCANNING DIAMETER |
|---|---|---|
| APERTURE | 5.6 | 1.18 |

| NAME | SHAPE | MATERIAL | PRINCIPAL: RADIUS OF CURVATURE | SECONDARY: RADIUS OF CURVATURE | PLANE INTERVAL | FOCAL LENGTH | SYNTHESIZED FOCAL LENGTH |
|---|---|---|---|---|---|---|---|
| CYLINDRICAL LENS 1 PLANE OF INCIDENCE | CYLINDER | BSC7 | ∞ | 102.229 | 3.0 | 200.000 | 55.665 |
| PLANE OF EMISSION | FLAT | - | ∞ | ∞ | 9.0 | | |
| CYLINDRICAL LENS 2 PLANE OF INCIDENCE | CYLINDER | BSC7 | ∞ | 37.258 | 3.0 | 72.891 | |
| PLANE OF EMISSION | FLAT | - | ∞ | ∞ | - | | |

FIG.2B

| NAME | SHAPE | MATERIAL | THICKNESS | α-tilt (*) | β-tilt (*) |
|---|---|---|---|---|---|
| λ/4 PLATE | FLAT | BSC7 | 0.61 | - | -5 deg |
| SOUNDPROOF GLASS | FLAT | BSC7 | 1.90 | -10.2 deg | 2.5 deg |
| DUSTPROOF GLASS | FLAT | BSC7 | 2.80 | - | 21 deg |

(*) α-tilt: ROTATION AROUND Z-AXIS WHEN COORDINATE SYSTEM FROM LIGHT SOURCE TO POLYGON MIRROR IS AS SHOWN IN FIG. 1
β-tilt: ROTATION AROUND Y-AXIS

| NAME | | SHAPE | PRINCIPAL: RADIUS OF CURVATURE | SECONDARY: RADIUS OF CURVATURE | PLANE INTERVAL | PRINCIPAL: SYNTHESIZED FOCAL LENGTH | SECONDARY: SYNTHESIZED FOCAL LENGTH |
|---|---|---|---|---|---|---|---|
| SCANNING LENS L1 | PLANE OF INCIDENCE | PRINCIPAL: SYMMETRIC NON-CIRCULAR SECONDARY: SYMMETRIC CURVED TOROIDAL | -125.930 | -500.000 | 14.000 | 239.82 | 71.97 |
| | PLANE OF EMISSION | PRINCIPAL: SYMMETRIC NON-CIRCULAR SECONDARY: ASYMMETRIC CURVED TOROIDAL | -60.678 | -550.000 | 99.340 | | |
| SCANNING LENS L2 | PLANE OF INCIDENCE | PRINCIPAL: SYMMETRIC NON-CIRCULAR SECONDARY: ASYMMETRIC CURVED TOROIDAL | -10000.000 | 268.018 | 3.500 | | |
| | PLANE OF EMISSION | PRINCIPAL: SYMMETRIC NON-CIRCULAR SECONDARY: SYMMETRIC CURVED TOROIDAL | 520.144 | -44.257 | - | | |

FIG.13

|  | L1 | | L2 | |
|---|---|---|---|---|
|  | Sur.1 | Sur.2 | Sur.1 | Sur.2 |
| $R_{m0}$ | -125.930 | -60.678 | -10000 | 520.144 |
| $a_{00}$ | 0.00000E+00 | 0.00000E+00 | 0.00000E+00 | 0.00000E+00 |
| $a_{04}$ | 6.91397E-07 | 7.94205E-07 | 3.29667E-07 | 1.27206E-07 |
| $a_{06}$ | -1.17421E-10 | 8.10435E-11 | -7.12268E-11 | -4.62723E-11 |
| $a_{08}$ | -7.59529E-14 | -4.46442E-14 | 6.28263E-15 | 4.04792E-15 |
| $a_{10}$ | 4.98921E-17 | 6.78493E-18 | -2.72118E-19 | -1.65776E-19 |
| $a_{12}$ | -7.99430E-21 | 4.18587E-21 | 4.69377E-24 | 2.58917E-24 |
|  |  |  |  |  |
| $R_{s0}$ | -500 | -550 | 268.018 | -44.257 |
| $b_{01}$ |  | 9.48903E-06 | 1.92169E-06 |  |
| $b_{02}$ |  | -4.04246E-06 | -9.73515E-07 | 3.26958E-07 |
| $b_{03}$ |  | 7.83108E-09 | 2.78624E-10 |  |
| $b_{04}$ |  | -2.32948E-09 | 7.99963E-11 |  |
| $b_{05}$ |  | -1.27532E-11 | -8.27927E-14 |  |
| $b_{06}$ |  | 1.22637E-12 | 1.16623E-14 |  |
| $b_{07}$ |  | 2.55440E-15 | 8.54769E-18 |  |
| $b_{08}$ |  | 4.46134E-16 | -1.73644E-18 |  |
| $b_{09}$ |  | 6.68092E-19 | -3.04034E-22 |  |
| $b_{10}$ |  | -1.67752E-19 | 6.41013E-23 |  |

FIG.14

| # | 1 | 2 | 3 | 4 | 5 | 6 | 7 | 8 | 9 | 10 |
|---|---|---|---|---|---|---|---|---|---|---|
| fCYL | 55.67 | ← | ← | ← | ← | ← | ← | ← | ← | ← |
| fCYL1 | -250 | -200 | -150 | -100 | 100 | 125 | 150 | 175 | 200 | 250 |
| fCYL2 | 46.80 | 45.07 | 42.49 | 38.26 | 102.96 | 86.71 | 80.25 | 76.03 | 72.89 | 69.03 |
| d1 | 7 | 7 | 7 | 7 | 18 | 17 | 14 | 12 | 11 | 9 |
| d2 | 57.22 | 57.61 | 58.26 | 59.56 | 45.65 | 48.09 | 50.47 | 51.85 | 52.60 | 53.66 |
| d1+d2 | 64.22 | 64.61 | 65.26 | 66.56 | 63.65 | 65.09 | 64.47 | 63.85 | 63.60 | 62.66 |

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-184151 filed in Japan on Aug. 19, 2010.

BACKGROUND OF THE INVENTION

1. Field of the Invention

The present invention relates to an optical scanning device and an image forming apparatus, such as a copier, a facsimile, a printer, or a multifunction peripheral having these functions, including the optical scanning device.

2. Description of the Related Art

In an image forming apparatus, such as copier, a facsimile, a laser printer, or a multifunction peripheral having these functions, using an optical scanning device as a writing unit for forming a latent image on an image carrier such as a photoreceptor, the number of scanning beams used by a scanning optical system of the optical scanning device has increased with increases in speed, resolution, write width, and the like. Furthermore, a color image forming apparatus including a plurality of optical scanning devices using a plurality of beams has prevailed.

As light sources of a plurality of beams mounted on the optical scanning device, a semiconductor laser array in which luminous points are one-dimensionally arranged at a predetermined interval (hereinafter, referred to as a laser diode (LD) array"), a surface-emitting laser array in which luminous points are two-dimensionally arranged at a predetermined interval (hereinafter, referred to as a "VCSEL (vertical cavity surface emitting laser)"), and the like are known. As for the former, there is a method to increase the number of beams by synthesizing beams emitted from a plurality of LD arrays by means of a beam synthesis prism or the like. This can be regarded as light sources in which, similarly to a VCSEL, luminous points are two-dimensionally arranged.

In general, as the number of beams emitted from a light source increases, it becomes difficult to keep an error in the interval between scanning lines formed on a scanned area or a deviation from a mean value of the scanning-line intervals between scanned positions within an acceptable level. If the error or deviation increases, a periodic stripe or non-uniform shading (referred to as 'banding') becomes noticeable in a halftone image or a periodic image such as a horizontal line image, resulting in image degradation. Furthermore, in a color image forming apparatus, the increase in the error or deviation causes a color shift (registration error) in each color, resulting in image degradation.

In Japanese Patent Application Laid-open No. H4-101112, Japanese Patent Application Laid-open No. H8-15625, and Japanese Patent Application Laid-open No. 2008-76712, there is described an adjusting means to move a cylindrical lens in a direction of an optical axis of the cylindrical lens or to rotate the cylindrical lens around the optical axis so that an interval between beams on a photoreceptor is adjusted to a target interval, thereby keeping the interval between beams on the photoreceptor and the beam diameter appropriately. However, a means for adjustment of a deviation of the scanning-line interval between scanning positions has not been disclosed.

SUMMARY OF THE INVENTION

It is an object of the present invention to at least partially solve the problems in the conventional technology.

According to an aspect of the present invention, there is provided an optical scanning device including a light source having a plurality of luminous points; a light deflecting unit that deflects and scans a plurality of beams emitted from the light source; a pre-deflection optical system that is arranged anterior to the light deflecting unit along a beam path, and adjusts the shape of a plurality of beams emitted from the light source and then focuses the beams roughly to a deflecting surface of the light deflecting unit as a linear image extending in a deflection scanning direction; and a scanning optical system that focuses the beams deflected and scanned by the deflecting surface of the light deflecting unit onto a scanned area. The pre-deflection optical system includes: a first optical element that adjusts the shape of a plurality of beams emitted from the light source; and a second and third optical elements that are arranged such that the second optical element is arranged closer to the light source than the third optical element is, both of the second and third optical elements having no refracting power in the deflection scanning direction and having positive refracting power only in a direction perpendicular to the deflection scanning direction. An interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction.

According to another aspect of the present invention, there is provided an image forming apparatus including: an image forming unit that includes an image carrier, a charging unit for charging the surface of the image carrier, an optical scanning device for forming an electrostatic latent image by exposing the surface of the image carrier charged by the charging unit to a light, and a developing unit for forming a toner image by transferring toner to the electrostatic latent image on the image carrier; a transfer unit that transfers the toner image formed on the image carrier onto a recording medium; and a fixing unit that fixes the toner image on the recording medium. The optical scanning device includes a light source having a plurality of luminous points; a light deflecting unit that deflects and scans a plurality of beams emitted from the light source; a pre-deflection optical system that is arranged anterior to the light deflecting unit along a beam path, and adjusts the shape of a plurality of beams emitted from the light source and then focuses the beams roughly to a deflecting surface of the light deflecting unit as a linear image extending in a deflection scanning direction; and a scanning optical system that focuses the beams deflected and scanned by the deflecting surface of the light deflecting unit onto a scanned area. The pre-deflection optical system includes a first optical element that adjusts the shape of a plurality of beams emitted from the light source; and a second and third optical elements that are arranged such that the second optical element is arranged closer to the light source than the third optical element is, both of the second and third optical elements having no refracting power in the deflection scanning direction and having positive refracting power only in a direction perpendicular to the deflection scanning direction. An interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction.

According to still another aspect of the present invention, there is provided an image forming apparatus including a plurality of image forming units. Each of the image forming units includes an image carrier, a charging unit for charging the surface of the image carrier, an optical scanning device for forming an electrostatic latent image by exposing the surface of the image carrier charged by the charging unit to a light, and a developing unit for forming a toner image by transferring toner to the electrostatic latent image on the image carrier; a transfer unit that transfers the toner images formed on the respective image carriers of the plurality of image forming units onto a recording medium; and a fixing unit that fixes the toner images on the recording medium. The optical scanning device includes a light source having a plurality of luminous points; a light deflecting unit that deflects and scans a plurality of beams emitted from the light source; a pre-deflection optical system that is arranged anterior to the light deflecting unit along a beam path, and adjusts the shape of a plurality of beams emitted from the light source and then focuses the beams roughly to a deflecting surface of the light deflecting unit as a linear image extending in a deflection scanning direction; and a scanning optical system that focuses the beams deflected and scanned by the deflecting surface of the light deflecting unit onto a scanned area. The pre-deflection optical system includes: a first optical element that adjusts the shape of a plurality of beams emitted from the light source; and a second and third optical elements that are arranged such that the second optical element is arranged closer to the light source than the third optical element is, both of the second and third optical elements having no refracting power in the deflection scanning direction and having positive refracting power only in a direction perpendicular to the deflection scanning direction. An interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table showing specifications of the optical system of the optical scanning device according to the present invention;

FIG. 13 is a table showing coefficients in equations (equations (1) and (2)) representing the shapes of the surfaces of scanning lenses L1 and L2; and FIG. 14 is a table showing an example of combinations of fCYL1, fCYL2, d1, and d2.

DETAILED DESCRIPTION OF THE PREFERRED EMBODIMENTS

Exemplary embodiments of the present invention are described in detail below with reference to the accompanying drawings.

First Embodiment

First, a first embodiment of the present invention is described with reference to the accompanying drawings.

Figure 1A:
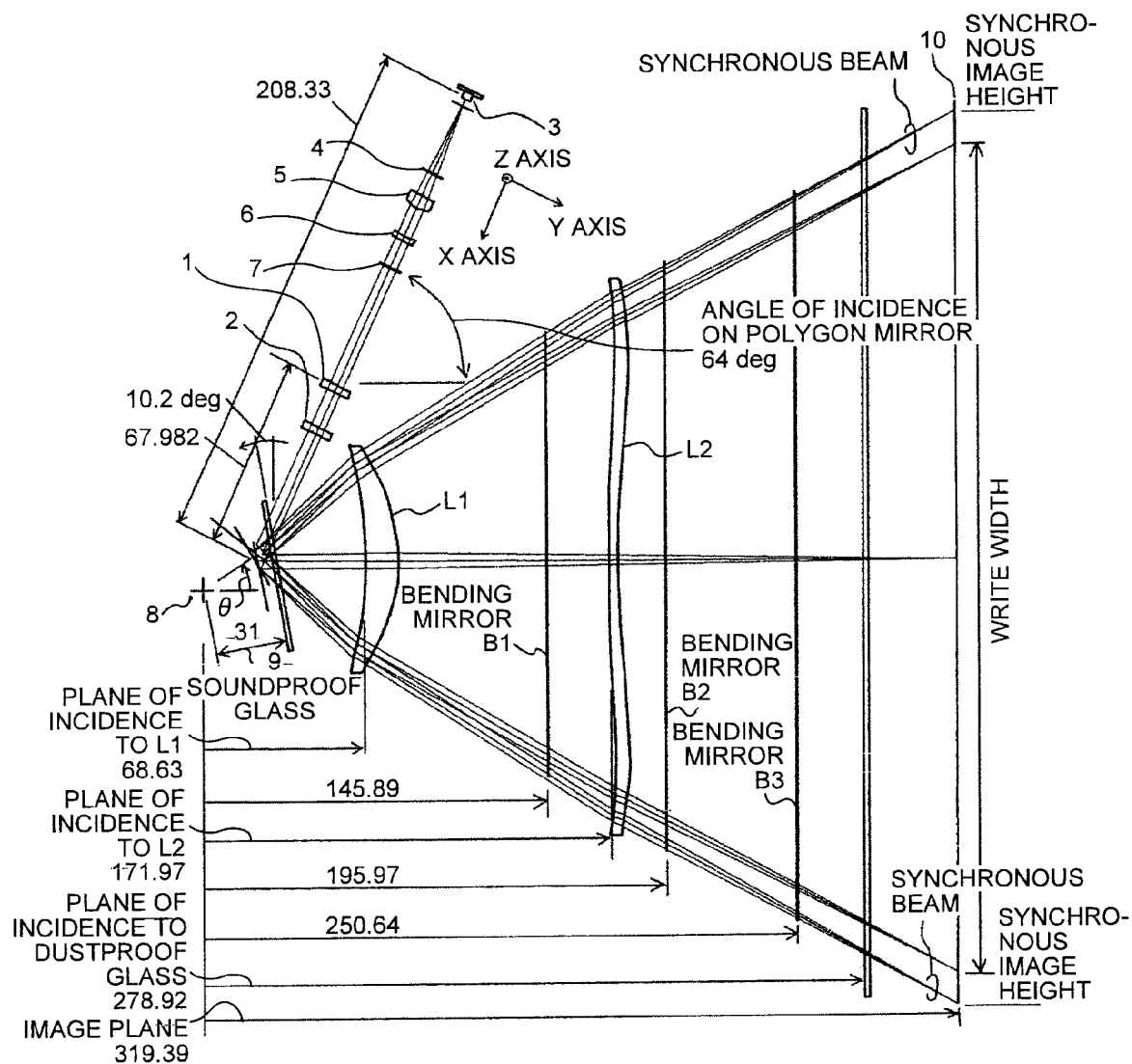
FIG. 1A is a main-scanning cross-sectional view of an optical system of an optical scanning device according to the present invention.
Figure 1B:
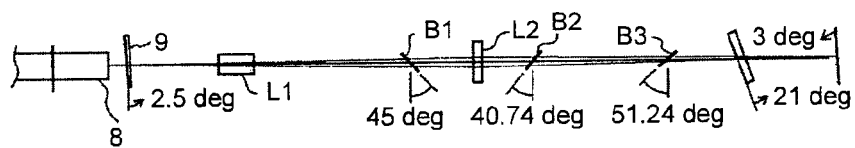
FIG. 1B is a sub-scanning cross-sectional view of the optical system of the optical scanning device according to the present invention.

FIGS. 1A and 1B are general views illustrating a schematic configuration from a light source of an optical system in an optical scanning device to a scanned area. FIG. 1A illustrates a cross-section parallel to a main scanning direction (a main-scanning cross-sectional view) and FIG. 1B illustrates a cross-section parallel to a sub-scanning direction (a sub-scanning cross-sectional view). FIG. 2 is a table showing specifications of each of the optical elements included in the optical system. Incidentally, the dimensions and distances of the optical elements in FIGS. 1A and 1B and FIG. 2, measured in units of a millimeter [mm], are shown for an exemplary purpose.

Figure 5:
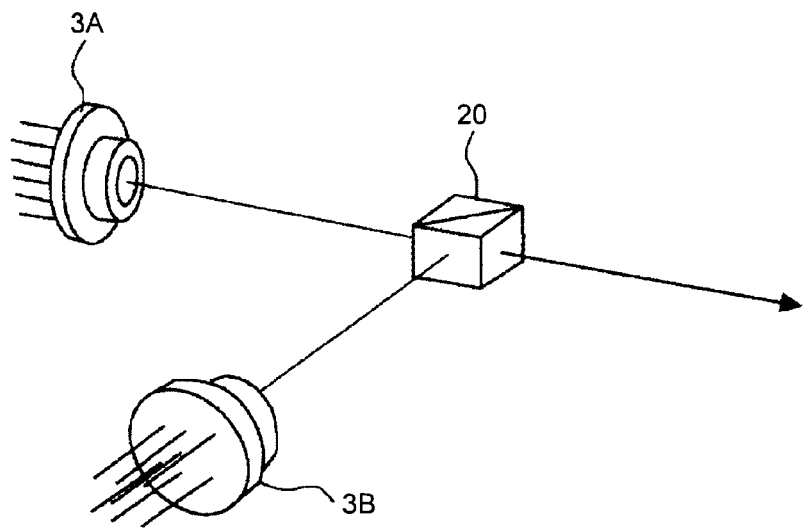
FIG. 5 is a diagram for explaining an example of the form of a light source using a plurality of semiconductor laser arrays.

As a light source 3, a vertical cavity surface emitting laser (VCSEL) is used as an example of a two-dimensional-array light source in which a plurality of luminous points are two-dimensionally arranged. A wavelength of a light emitted from the light source is 782 nm. Incidentally, the light source is not limited to a VCSEL; alternatively, a synthesized beam, using a beam synthesis prism 20 or the like, of the beams emitted from the two edge-emitting semiconductor laser arrays (hereinafter, referred to as "LD arrays") 3A and 3B, in which luminous points are one-dimensionally arranged as illustrated in FIG. 5, can be used as the light source. Or, a single LD array can be used as the light source.

In a case in which a two-dimensional-array light source 3 such as a VCSEL is used, an array of luminous points can be adjusted in an ideal two-dimensional arrangement by rotating a light source unit around the optical axis.

A laser light emitted from the VCSEL is linearly polarized in a direction parallel to a direction perpendicular to a deflected scanning direction (hereinafter, referred to as the "sub-scanning direction"), which is a direction perpendicular to a direction in which the laser light is deflected and scanned by a light deflecting unit to be described later (a deflection scanning direction (hereinafter, referred to as the "main scanning direction")). The VCSEL, which is the light source 3, emits 40 beams, and a distance between two most alienated scanning lines in the sub-scanning direction on a scanned area 10 is about 0.4 mm.

Figure 3:
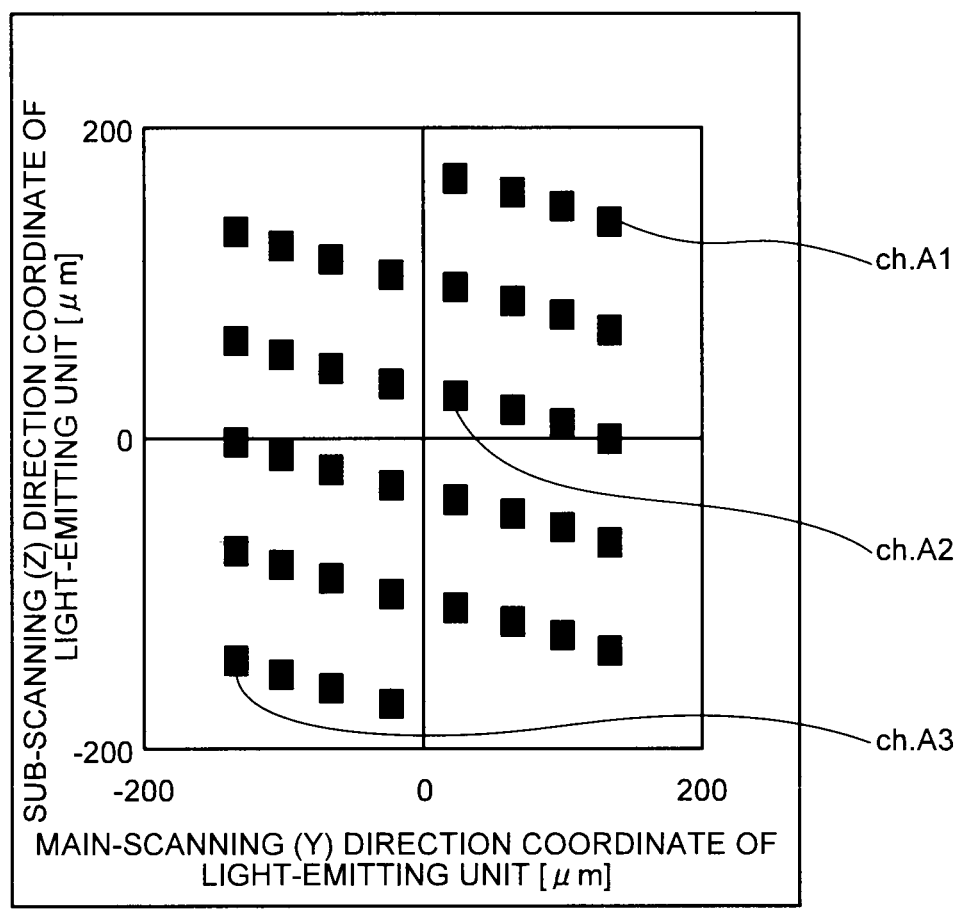
FIG. 3 is an explanatory diagram illustrating an array of luminous points of a surface-emitting laser.

FIG. 3 is a diagram illustrating an example of an array of luminous points of the VCSEL. The VCSEL is a monolithic laser array element.

A λ/4 plate 4 converts the linear polarization of a beam from the light source 3 into a circular polarization.

A glass lens (coupling lens) 5 and a plastic lens 6 convert the beam from the light source 3 into a nearly parallel light. Furthermore, the glass lens (coupling lens) 5 and the plastic lens 6 have the effect of reducing a variation in beam waist position in the event of a temperature change, and suppress a variation in diameter of a beam spot.

An aperture 7 adjusts the shape of the parallel light thereby stabilizing the diameter of a beam spot. In the present optical system, the size of the aperture 7 is 5.6 mm long in the main scanning direction and 1.18 mm wide in the sub-scanning direction, and the diameter of a beam spot on the scanned area 10 is 55 μm in both the main scanning direction and the sub-scanning direction.

Although not illustrated in the drawings, the elements from the light source 3 to the aperture 7 are configured as an integrated structure on the light source unit. Therefore, by adjusting both the glass lens and the plastic lens so as to reduce the effects of the assembly error and production error of the elements, it becomes possible to adjust the optical system at the level of light source units.

A cylindrical lens 1 and a cylindrical lens 2 both have the positive refracting power in the sub-scanning direction only, and focus the parallel beam in the sub-scanning direction near a deflection reflecting surface of a light deflecting unit (hereinafter, referred to as a "polygon mirror") 8. When a refracting power of the cylindrical lens having the larger refracting power (the cylindrical lens 2) is denoted by PM and a refracting power of the other cylindrical lens (the cylindrical lens 1) is denoted by PS, a ratio of refracting power is PM/PS=2.7.

Figure 10:
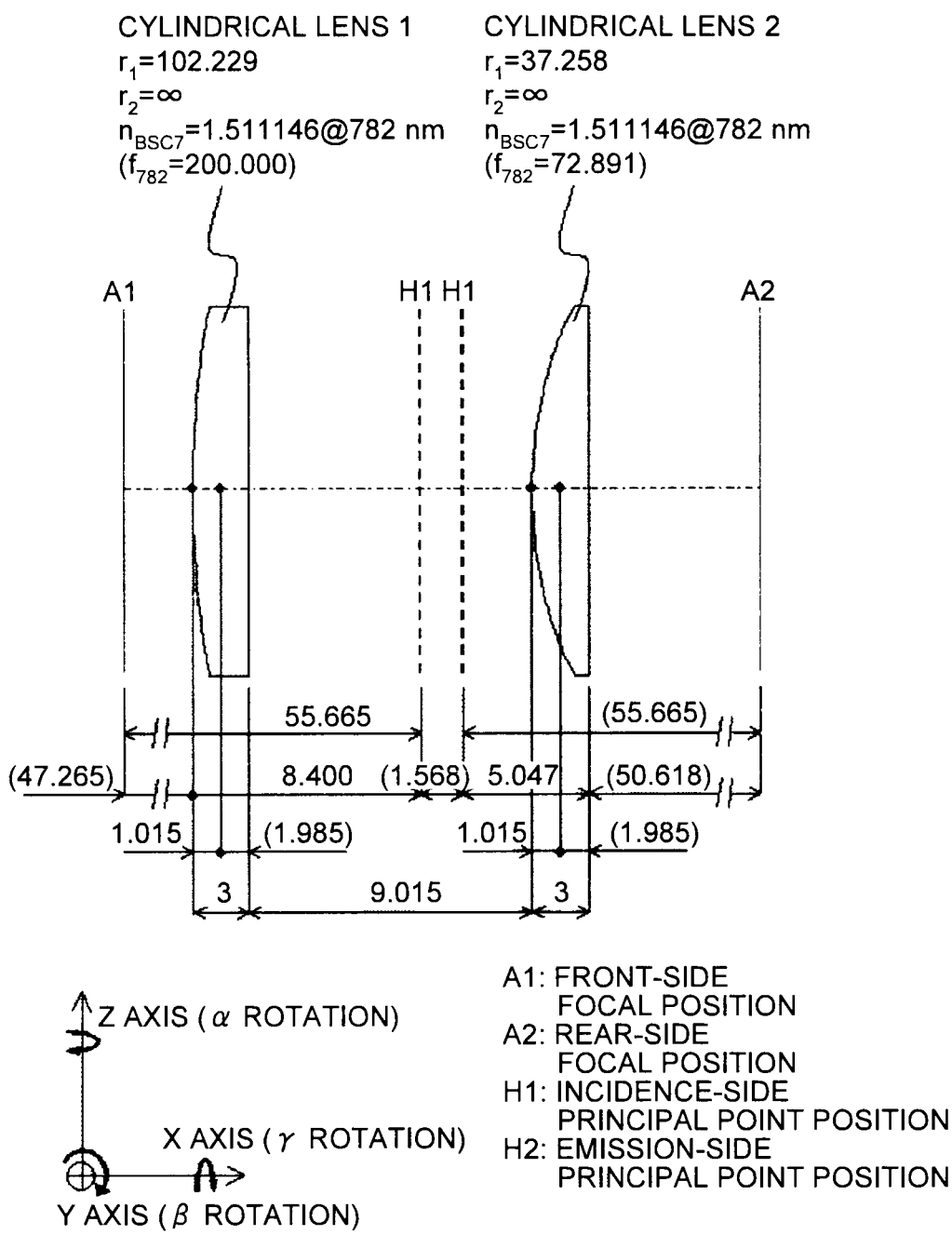
FIG. 10 is a diagram for explaining a detailed configuration of a cylindrical lens unit in the optical system of the optical scanning device according to the present invention.

FIG. 10 shows the details of the shapes and arrangement of the cylindrical lenses 1 and 2.

Figure 11:
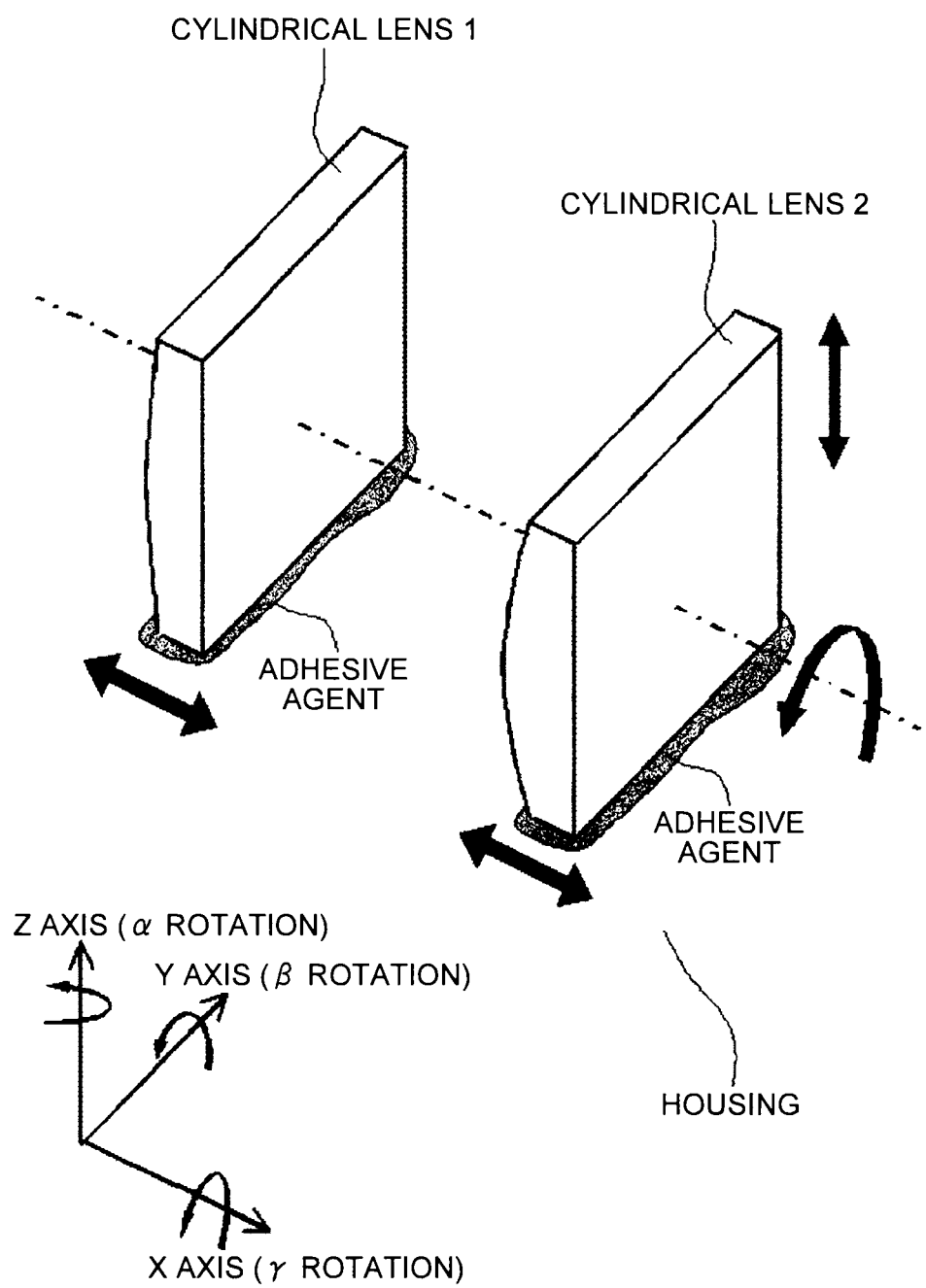
FIG. 11 is a diagram for explaining a method of adjustment and assembly of the cylindrical lens unit in the optical system of the optical scanning device according to the present invention.

To adjust the diameter of a beam spot, an interval between scanning lines, and a deviation of the scanning-line interval between scanning positions, the directions of these cylindrical lenses 1 and 2 are adjusted in a direction of the optical axis of the optical system from the light source 3 to the polygon mirror 8 (an X-axis direction of the coordinate system illustrated in FIGS. 1A and 10), a direction perpendicular to the optical axis (a Z-axis direction of the coordinate system illustrated in FIGS. 1A and 10), and a direction of rotation around the optical axis (a direction of rotation around the Z-axis), and then the cylindrical lenses 1 and 2 are fixed to an optical housing unit (not shown). A method of the fixation of the cylindrical lenses 1 and 2 includes adhesion of the optical elements to the optical housing with ultraviolet curable resin, an adhesive agent, or the like. Incidentally, there is no positioning unit for controlling the directions of the optical elements in the direction of the optical axis, so that the adjustment here means if the shape of the housing unit allows the optical elements to move, the optical elements can be considered to be substantially adjusted. Although a method of the adjustment of the cylindrical lenses will be described later, in the present invention, as illustrated in FIG. 11, the directions of the cylindrical lenses 1 and 2 are adjusted in the direction of the optical axis (the X-axis direction of the coordinate system illustrated in FIGS. 1A and 10), and the direction of the cylindrical lens 2 is adjusted in the direction perpendicular to the optical axis (the Z-axis direction of the coordinate system illustrated in FIGS. 1A and 10) and the direction of rotation around the optical axis (the direction of rotation around the Z-axis), and after that, the bottom surfaces of the cylindrical lenses 1 and 2 are adhered to the housing unit thereby fixing the cylindrical lenses 1 and 2 to the housing unit.

The cylindrical lenses 1 and 2 are arranged so that the convex side of each of the cylindrical lenses 1 and 2 is the plane of incidence. This arrangement makes a reflected return light from the plane of incidence of the cylindrical lens 1 to the light source direction a divergent beam in the sub-scanning direction; therefore, even if the reflected light returns to the side of the VCSEL, it is possible to suppress an oscillatory state from becoming unstable.

A soundproof glass 9 is placed at a distance of 31 mm from the center of rotation of the polygon mirror 8 and at angles of 10.2 degrees to the main scanning direction and 2.5 degrees to the sub-scanning direction.

The beam from the light source 3 enters the polygon mirror 8 at an angle of 64 degrees to the normal line of the scanned area 10, and is deflected by the polygon mirror 8 having an inscribed circle with the radius of 25 mm and 6 pieces of deflection reflecting surfaces, and then focused onto the scanned area 10 at a uniform velocity by scanning lenses L1 and L2.

The shapes of the surfaces of the scanning lenses L1 and L2 are represented by the following equations (1) and (2), and the coefficients are as shown in the table of FIG. 13, in which Sur.1 and Sur.2 denote, respectively, the planes of incidence and exiting. Here, in the equations, X denotes the direction of the optical axis (an emitting direction of the beam), Y denotes the main scanning direction, $C_{m0}=1/R_{m0}$ denotes a main-scanning directional curvature, and $C_s(Y)$ denotes a curvature in the sub-scanning direction to Y.

$$X(Y) = \frac{C_{m0} \cdot Y^2}{1 + \sqrt{1 - (1+a_{00}) \cdot C_{m0}^2 \cdot Y^2}} + a_{01} \cdot Y + a_{02} \cdot Y^2 + a_{03} \cdot Y^3 + a_{04} \cdot Y^4 + \ldots \quad (1)$$

$$C_s(Y) = \frac{1}{R_{s0}} + b_{01} \cdot Y + b_{02} \cdot Y^2 + b_{03} \cdot Y^3 + b_{04} \cdot Y^4 + \ldots \quad (2)$$

A dustproof glass is tilted by 21 degrees in the sub-scanning cross-section.

The normal line of the scanned area 10 is tilted by 3 degrees in the sub-scanning cross-section so that a specularly-reflected light from the scanned area 10 does not cause any problems.

A range of the scanned area 10 written as a write width in FIG. 1A is a range of the scanned area 10, i.e., an image carrier (as a concrete example, a photoconductive photoreceptor) where a light corresponding to image data reaches and is written; at an image height written as a synchronous image height in FIG. 1A, the light does not actually reach the photoreceptor, but a signal is detected by a synchronous detecting unit (not shown) and used to determine the timing to write. By detecting the signals on both the write start side and the write end side, a time-dependent variation of the signal due to the effect of temperature or the like can be detected and be subjected to a feedback correction. The write width is 328 mm, and a distance between the synchronous image heights is 354 mm.

Subsequently, a method for the adjustment of the cylindrical lenses 1 and 2 is described.

When a synthesized focal length of the glass lens (coupling lens) 5 and the plastic lens 6 in the sub-scanning direction of the optical scanning device according to the present invention is denoted by fCOL, a synthesized focal length of the cylindrical lenses 1 and 2 in the sub-scanning direction is denoted by fCYL, and the lateral magnification of the scanning lenses L1 and L2 is denoted by mFθ, the magnification of the entire optical system in the sub-scanning direction is represented by (fCYL/fCOL)×mFθ.

At this time, if there is a manufacturing error of a component, such as a lens, or a placement error of the component, the magnification of the entire optical system in the sub-scanning direction may change, and this may cause an error in the interval between scanning lines on the scanned area or misregistration of the image plane in the sub-scanning direction.

As described above, in a multi-beam scanning device, as the number of scanning beams increases, it becomes more difficult to keep an error in the interval between scanning lines in an acceptable level, and accordingly, a means for fine tuning means of the scanning-line interval becomes more required.

In the present invention, unlike conventional technologies using one cylindrical lens, the two cylindrical lenses 1 and 2 are provided, and adjustment of the magnification of the entire optical system in the sub-scanning direction (i.e., adjustment of the interval between scanning lines to a desired interval) is performed by adjusting an interval between the cylindrical lenses in the direction of the optical axis (the X-axis direction of the coordinate system shown in FIG. 1A) thereby changing fCYL.

When the focal lengths of the cylindrical lenses 1 and 2 are denoted by fCYL1 and fCYL2, respectively, and a distance from the emission-side principal plane of the cylindrical lens 1 to the incidence-side principal plane of the cylindrical lens 2 (a distance between the principal planes of the cylindrical lenses) is denoted by d1, fCYL is represented by fCYL=fCYL1×fCYL2/(fCYL1+fCYL2−d1).

Furthermore, when a distance from the emission-side principal plane of the cylindrical lens 2 to an imaging point in the sub-scanning direction is denoted by d2, d2 is represented by d2=(d1−fCYL1)×fCYL2/(d1−fCYL1−fCYL2).

A table of FIG. 14 shows an example of combinations of fCYL1, fCYL2, d1, and d2.

Under the condition that the focal length fCYL1 of the cylindrical lens 1 and the focal length fCYL2 of the cylindrical lens 2 are fixed, fCYL varies according to d1. Namely, a zoom cylindrical lens includes the cylindrical lenses 1 and 2.

After the distance d1 between the cylindrical lenses is adjusted, the position of the imaging plane in the sub-scanning direction is adjusted by displacing the cylindrical lenses 1 and 2 together in the X-axis direction.

Incidentally, although the cylindrical lens 1 is described as a lens having a low refracting power and the cylindrical lens 2 is described as a lens having a high refracting power, the relation in the refracting power can be reversed between the two cylindrical lenses.

As shown in the table of FIG. 14, a combination of fCYL1 and fCYL2 can be a combination of a positive and a negative or a combination of a positive and a positive; however, when values of fCYL2 combined with the same value of |fCYL1| (for example, #1 and #10, #2 and #9, #3 and #7, etc.) are compared, a combination of positive refracting power and positive refracting power can make the refracting power of the cylindrical lens 2 smaller.

It is preferable to make the refracting power of the cylindrical lens 2 smaller in reducing the error sensitivity for lens assembly (for example, by rotation around the optical axis of the cylindrical lens (rotation around the X-axis shown in FIGS. 1A and 10), the diameter of an imaging spot on the scanned area and degradation of the shape of the spot can be reduced).

In the optical scanning device according to the present invention, a combination #9 in the table 2 of FIG. 14 is employed; in this case, an imaging characteristic is not degraded as compared to a case in which one cylindrical lens is used.

Figure 4:
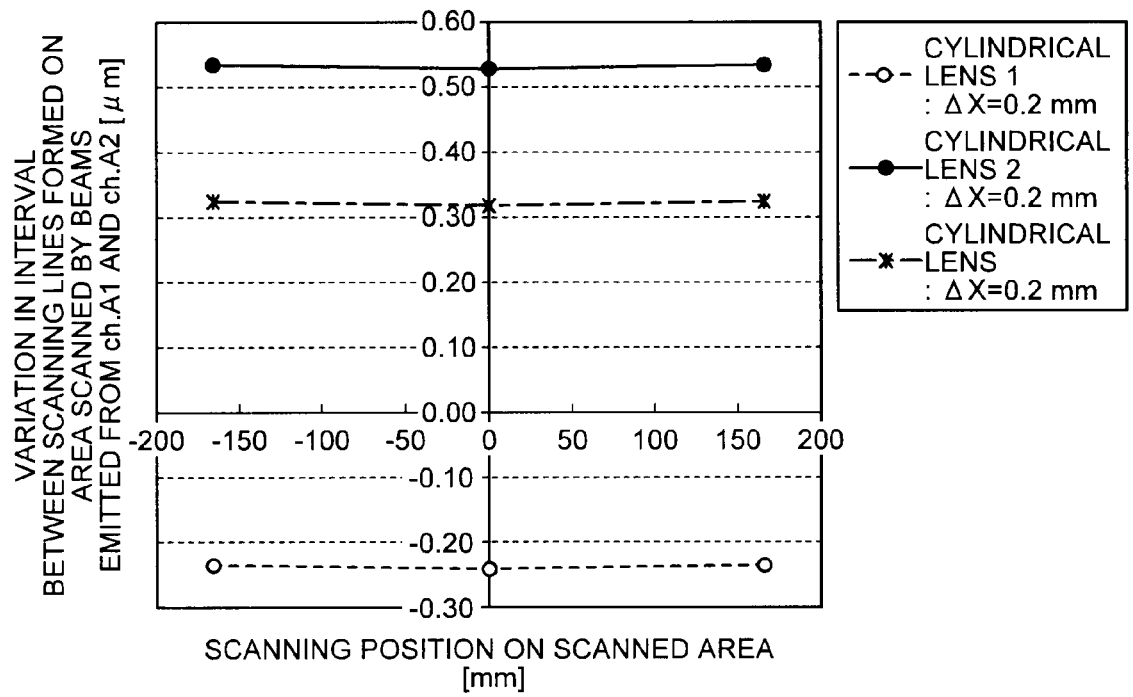
FIG. 4 is a diagram for explaining a variation of the interval between scanning lines formed on a surface scanned by beams emitted from the two most alienated luminous points in a main scanning direction due to displacement of a cylindrical lens in an X-axis direction.

FIG. 4 shows the image height position and a variation in the error of the interval between scanning lines when the cylindrical lenses 1 and 2 are independently displaced by ΔX=0.2 mm in the X-axis direction and when a single cylindrical lens is displaced by ΔX=0.2 mm in the X-axis direction (written as "cylindrical lens: ΔX=0.2 mm" in FIG. 4).

The results in FIG. 4 for the single cylindrical lens means calculation results which can be obtained when a single cylindrical lens having the same focal length as the synthesized focal length (=55.665 mm) of the cylindrical lenses 1 and 2 is used instead of the cylindrical lenses 1 and 2 (the same shall apply hereinafter).

Incidentally, the interval between scanning lines is calculated using beams emitted from the two most alienated channels ch.A1 and ch.A3 in a YZ direction in a luminous point configuration diagram of the VCSEL illustrated in FIG. 3 (i.e., the two most alienated imaging spots on the scanned area in the deflection scanning direction and the direction perpendicular to the deflection scanning direction) (the same shall apply hereinafter).

There is no deviation in the scanning-line interval between scanning positions due to ΔX, and the interval between scanning lines changes almost uniformly over the whole area. On the other hand, as for a component manufacturing error and component placement error of the optical elements, the magnitude of an error in the interval between scanning lines causes an error such as a deviation between scanning positions which varies according to the scanning position (hereinafter, referred to as an "image-height deviation"). This error is noticeable in scanning lines formed from beams emitted from the two most alienated luminous points in the main scanning direction (the Y-axis direction of the coordinate system shown in FIG. 1A) in the light source unit.

In the present invention, an image-height deviation is adjusted by displacing the cylindrical lens in a direction perpendicular to the optical axis (the Z-axis direction of the coordinate system illustrated in FIG. 1A) thereby making a change in the interval between scanning lines with respect to the scanning position as monotonic as possible irrespective of whether it is a monotonic increase or decrease.

Figure 6:
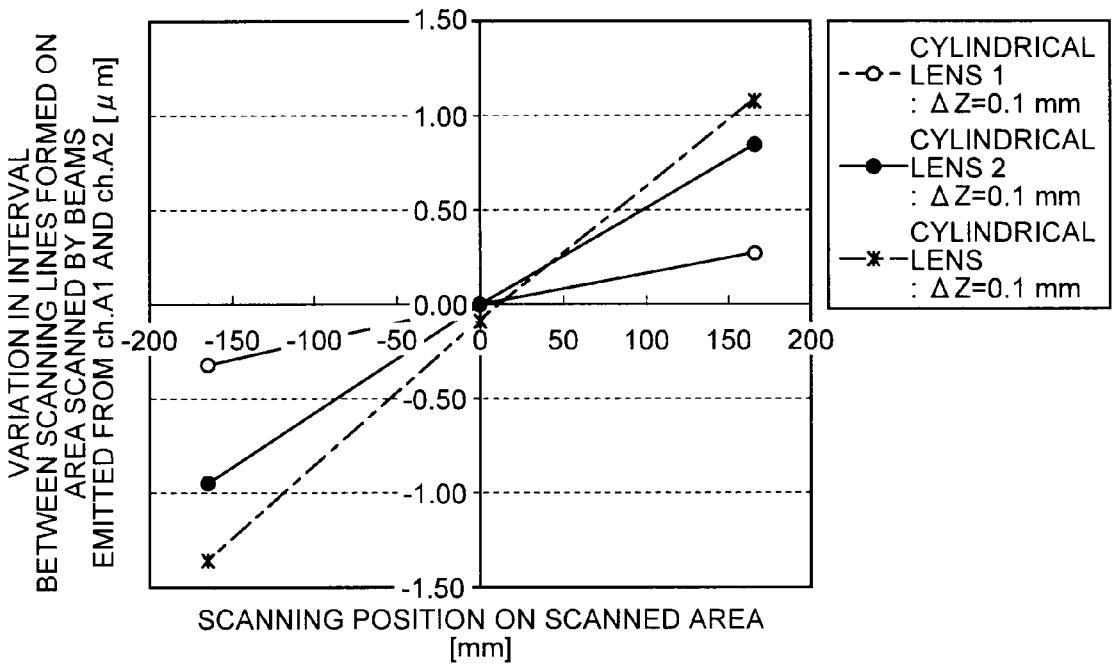
FIG. 6 is a diagram for explaining a variation of the interval between scanning lines formed on the surface scanned by beams emitted from the two most alienated luminous points in the main scanning direction due to displacement of the cylindrical lens in a Z-axis direction.

FIG. 6 shows a relation between the image height position and a scanning-line interval error $\Delta P(\Delta Z)$ when the cylindrical lenses 1 and 2 are independently displaced by 0.1 mm in the Z-axis direction ($\Delta Z$=0.1 mm) and when a single cylindrical lens is displaced by 0.1 mm in the Z-axis direction (written as "cylindrical lens: $\Delta Z$=0.1 mm" in FIG. 6).

As can be seen from FIG. 6, in the optical scanning device according to the present invention, both the cylindrical lens 1 and the cylindrical lens 2 are designed so that an image-height deviation between scanning lines due to $\Delta Z$ changes in positive and negative directions. That is, when an error in the scanning-line interval $\Delta P(\Delta Z)$ corresponding to $\Delta Z$=0.1 mm at the scanning start position is denoted by $\Delta Ps(\Delta Z)$, and an error in the scanning-line interval $\Delta P(\Delta Z)$ at the scanning end position is denoted by $\Delta Pe(\Delta Z)$, the multiplication $\Delta Ps(\Delta Z) \times \Delta Pe(\Delta Z)$ becomes negative.

In the optical scanning device according to the present invention, it is adjusted that an image-height deviation between scanning lines is reduced by this action.

When the differences $|\Delta Ps(\Delta Z)-\Delta Pe(\Delta Z)|$ in the variation of the interval between scanning lines at the scanning start and end positions due to $\Delta Z$ of the cylindrical lens 1, the cylindrical lens 2, and the single cylindrical lens are denoted by $|\Delta P1s(\Delta Z)-\Delta P1e(\Delta Z)|$, $|\Delta P2s(\Delta Z)-\Delta P2e(\Delta Z)|$, and $|\Delta POs(\Delta Z)-\Delta POe(\Delta Z)|$, respectively, as shown in FIG. 6, the following inequalities are satisfied:

$$|\Delta POs(\Delta Z)-\Delta POe(\Delta Z)|>|\Delta P2s(\Delta Z)-\Delta P2e(\Delta Z)|>|\Delta P1s(\Delta Z)-\Delta P1e(\Delta Z)|.$$

Namely, the configuration of the cylindrical lenses in the present invention provides the tolerance to $\Delta Z$ displacement; therefore, as compared to a case in which a conventional single cylindrical lens is used, the positioning of the cylindrical lenses is easier, and assembly man-hours can be reduced.

Next, a difference $|\Delta Ps(\Delta Z)-\Delta Pe(\Delta Z)|$ in the variation of the interval between scanning lines at the scanning start and end positions due to $\Delta Z$ is calculated.

When a difference in the variation of the interval between scanning lines at the scanning start and end positions due to $\Delta Z$ of the cylindrical lens having a higher refracting power (the cylindrical lens 2) is denoted by $|\Delta PMs(\Delta Z)-\Delta PMe(\Delta Z)|$, and a difference in the variation of the interval between scanning lines at the scanning start and end positions due to $\Delta Z$ of the other cylindrical lens (the cylindrical lens 1) is denoted by $|\Delta Pms(\Delta Z)-\Delta Pme(\Delta Z)|$, in the optical scanning device according to the present invention, the following relation is satisfied:

$$|\Delta PMs(\Delta Z)-\Delta PMe(\Delta Z)|/|\Delta Pms(\Delta Z)-\Delta Pme(\Delta Z)|\approx 3$$

Namely, the ratio of the sensitivity, with respect to $\Delta Z$, of the cylindrical lens 1 to the sensitivity of the cylindrical lens 2 is 1 to 3.

In the optical scanning device according to the present invention, the ratio of the sensitivity with respect to $\Delta Z$ is provided as above, and the Z-directional position of the cylindrical lens 1 is not adjusted (provided that $\Delta Z=\pm 0.1$ mm or smaller in $|\Delta Z|$), and an image-height deviation due to the displacement of the cylindrical lens 1 in the Z direction is corrected by the adjustment of the other cylindrical lens (the cylindrical lens 2) in the Z direction. Therefore, assembly man-hours can be reduced by reducing the number of adjusting processes. Incidentally, it is found that if the condition $|\Delta PMs(\Delta Z)-\Delta PMe(\Delta Z)|/|\Delta Pms(\Delta Z)-\Delta Pme(\Delta Z)|\geq 2.5$ is satisfied, even when the Z-directional adjustment of the cylindrical lens having a smaller refracting power is not made, correction can be made by adjusting the other cylindrical lens in the Z direction only. Such a characteristic is obtained on the condition that the ratio of the refracting power between the cylindrical lenses is PM/PS$\geq$2.5 (in the present invention, PM/PS=2.7).

Figure 7:
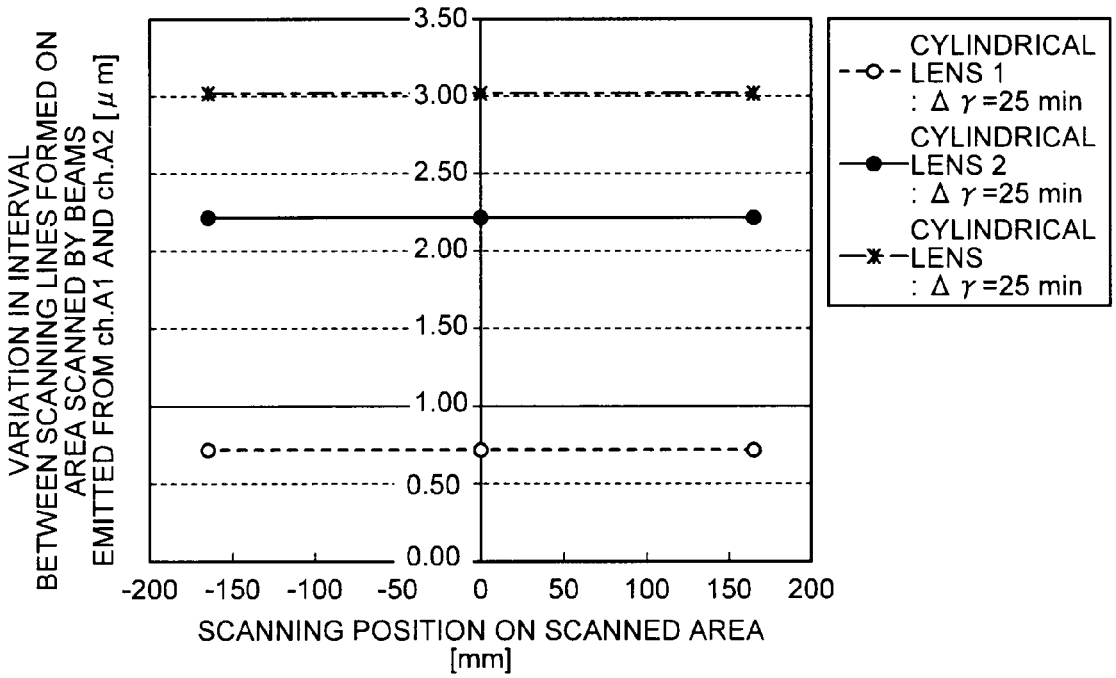
FIG. 7 is a diagram for explaining a variation of the interval between scanning lines formed on the surface scanned by beams emitted from the two most alienated luminous points in the main scanning direction due to displacement of the cylindrical lens in a γ-rotation direction.

FIG. 7 shows the image height position and a variation in the error of the interval between scanning lines when the cylindrical lenses 1 and 2 are independently displaced by $\Delta\gamma$=25 min in a direction of rotation about the Z axis ($\gamma$ rotation) and when a single cylindrical lens is displaced by $\Delta\gamma$=25 min (written as "cylindrical lens: $\Delta\gamma$=25 min" in FIG. 7). There is little image-height deviation between scanning lines due to $\Delta\gamma$, and the image height changes almost uniformly over the whole area. When a variation of the interval between scanning lines due to $\Delta\gamma$ at the central image height is denoted by $\Delta PC(\Delta\gamma)$, $\Delta PC(\Delta\gamma)$ of the cylindrical lens having a larger refracting power (the cylindrical lens 2) is denoted by $\Delta PCM(\Delta\gamma)$, $\Delta PC(\Delta\gamma)$ of the other cylindrical lens is denoted by $\Delta PCm(\Delta\gamma)$, and $\Delta PC(\Delta\gamma)$ of a single cylindrical lens is denoted by $\Delta PCO(\Delta\gamma)$, in the optical scanning device according to the present invention, the following relation is satisfied:

$$\Delta PCM(\Delta\gamma)/\Delta PCm(\Delta\gamma)\approx 3.$$

Furthermore, the following relation is satisfied:

$$|\Delta PCO(\Delta\gamma)|>|\Delta PCM(\Delta\gamma)|>|\Delta PCm(\Delta\gamma)|$$

Namely, the configuration of the cylindrical lenses in the present invention provides the tolerance to the $\Delta\gamma$ displacement; therefore, as compared to a case in which a conventional single cylindrical lens is used, the positioning of the cylindrical lenses is easier, and assembly man-hours can be reduced. Furthermore, in a comparison between the cylindrical lenses 1 and 2, the ratio of the sensitivity, with respect to the $\Delta\gamma$ displacement, of the cylindrical lens 1 to the cylindrical lens 2 is 1 to 3. In the optical scanning device according to the present invention, the ratio of the sensitivity with respect to the $\Delta\gamma$ placement is thus provided, and the $\gamma$-directional position of the cylindrical lens 1 is not adjusted (provided that $\Delta\gamma=\pm 25$ min or smaller in $|\Delta\gamma|$), and an error of the interval between scanning lines due to the $\gamma$-directional displacement of the cylindrical lens 1 is corrected by the $\gamma$-directional adjustment of the other cylindrical lens (the cylindrical lens 2). Therefore, assembly man-hours can be reduced by reduction of the number of adjusting processes.

Incidentally, the $\gamma$ rotation of the cylindrical lens also affects the diameter of an imaging spot on the scanned area. This cannot be corrected if one or the other of the $\gamma$ of the cylindrical lenses is too large; however, it has been found that insofar as the condition $\Delta PCM(\Delta\gamma)/\Delta PCm(\Delta\gamma)\geq 2.5$ is satisfied, even if the $\gamma$ rotation of the cylindrical lens 1 is not adjusted, a deviation of the diameter of an imaging spot can be kept equal to or smaller than 1 $\mu$m. Such a characteristic is obtained when the ratio of the refracting power between the cylindrical lenses is PM/PS$\geq$2.5 (in the present invention, PM/PS=2.7).

Second Embodiment

A second embodiment of the present invention is described with reference to the accompanying drawings.

Figure 8:
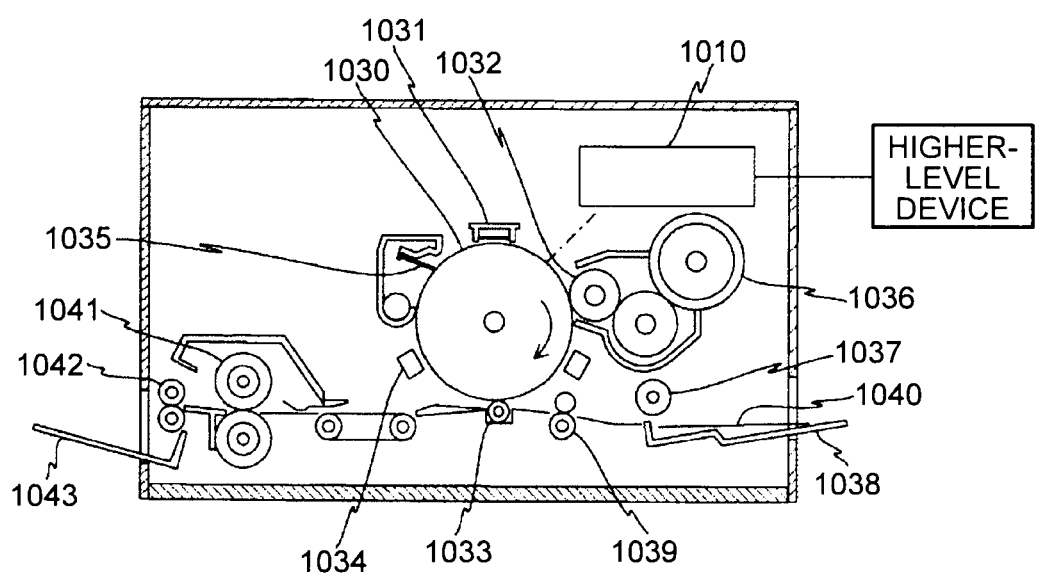
FIG. 8 is a diagram for explaining an example of a schematic configuration of an image forming apparatus equipped with the optical scanning device according to the present invention.

FIG. 8 shows a schematic configuration of a laser printer 1000 as an image forming apparatus equipped with the optical scanning device described in the first embodiment.

This laser printer 1000 includes an optical scanning device 1010, a photosensitive drum 1030 as an image carrier, a charger 1031, a developing roller 1032, a transfer roller 1033, an discharge unit 1034, a cleaning blade 1035, a toner cartridge 1036, a paper feed roller 1037, a paper feed tray 1038, a pair of registration rollers 1039, a fixing roller 1041, a paper discharge roller 1042, and a paper discharge tray 1043, etc.

On the surface of the photosensitive drum 1030 which is a scanned area, a photosensitive layer is formed. Namely, the surface of the photosensitive drum 1030 is a scanned area. Here, the photosensitive drum 1030 rotates in a direction indicated by the arrow in FIG. 8.

The charger 1031, the developing roller 1032, the transfer roller 1033, the discharge unit 1034, and the cleaning blade 1035 are arranged near the surface of the photosensitive drum 1030, and are included in an image forming unit along with the photosensitive drum 1030. The charger 1031, the developing roller 1032, the transfer roller 1033, the discharge unit 1034, and the cleaning blade 1035 are arranged in this order along a rotational direction of the photosensitive drum 1030.

The charger 1031 uniformly charges the surface of the photosensitive drum 1030.

The optical scanning device 1010 irradiates the surface of the photosensitive drum 1030, charged by the charger 1031, with a light modulated on the basis of image data from a higher-level device (for example, a personal computer, and the like). As a result, a latent image corresponding to the image data is formed on the surface of the photosensitive drum 1030. The formed latent image moves to a direction of the developing roller 1032 in association with the rotation of the photosensitive drum 1030. Incidentally, the configuration of the optical scanning device 1010 is described in the first embodiment.

In the toner cartridge 1036, toner is contained. The toner is supplied to the developing roller 1032.

The developing roller 1032 transfers toner supplied from the toner cartridge 1036 to the latent image formed on the surface of the photosensitive drum 1030, thereby rendering the latent image of the image data visible. The latent image on which toner is transferred (which is also referred to as a toner image hereafter) moves to a direction of the transfer roller 1033 in association with the rotation of the photosensitive drum 1030.

In the paper feed tray 1038, a plurality of recording sheets 1040, which are recording media, are contained. The paper feed roller 1037, which is placed near the paper feed tray 1038, picks up a sheet of recording sheet 1040 from the paper feed tray 1038 piece by piece, and conveys the recording sheet 1040 to the pair of registration rollers 1039. The pair of registration rollers 1039 temporarily holds the recording sheet 1040 picked up by the paper feed roller 1037, and conveys the recording sheet 1040 toward a gap between the photosensitive drum 1030 and the transfer roller 1033 in association with the rotation of the photosensitive drum 1030.

To electrically attract the toner on the surface of the photosensitive drum 1030 to the recording sheet 1040, a voltage of a polarity opposite to that of the toner is applied to the transfer roller 1033. By the application of the voltage, the toner image on the surface of the photosensitive drum 1030 is transferred to the recording sheet 1040. The recording sheet 1040 onto which the toner image is transferred is conveyed to the fixing roller 1041.

The fixing roller 1041 applies heat and pressure to the recording sheet 1040, thereby fixing the toner image on the recording sheet 1040. The recording sheet 1040 on which the toner image is fixed is conveyed to the paper discharge tray 1043 through the paper discharge roller 1042, and sequentially stacked on the paper discharge tray 1043.

The discharge unit 1034 discharges electricity from the surface of the photosensitive drum 1030 after the toner image is transferred to the recording sheet 1040.

The cleaning blade 1035 removes toner (residual toner) remaining on the surface of the photosensitive drum 1030. The surface of the photosensitive drum 1030 from which the residual toner is removed returns to the position opposed to the charger 1031 again.

In the above embodiment, the case of the laser printer 1000 is described as an image forming apparatus; however, the image forming apparatus according to the present invention is not limited to this. Namely, according to the present invention, an image forming apparatus including the optical scanning device 1010 can form a high-definition image at high speed.

For example, it can be an image forming apparatus which includes the optical scanning device 1010 and directly irradiates a color developing medium which develops color by exposure to a laser light (for example, a color developing sheet) with a laser light.

Furthermore, it can be an image forming apparatus using a silver halide film as an image carrier. In this case, a latent image is formed on the silver halide film by optical beam scanning, and the latent image can be visualized by the same developing process as that in an ordinary silver halide photographic process. Then, the visualized image can be transferred to a printing sheet by the same printing process as that in the ordinary silver halide photographic process. Such an image forming apparatus is implemented as an optical platemaking apparatus and an optical drawing apparatus for drawing a computed tomography (CT)-scanned image or the like.

Moreover, even an image forming apparatus for forming a multicolor image can form a high-definition image at high speed by using an optical scanning device for color image.

Third Embodiment

A third embodiment of the present invention is described with reference to the accompanying drawings.

Figure 9:
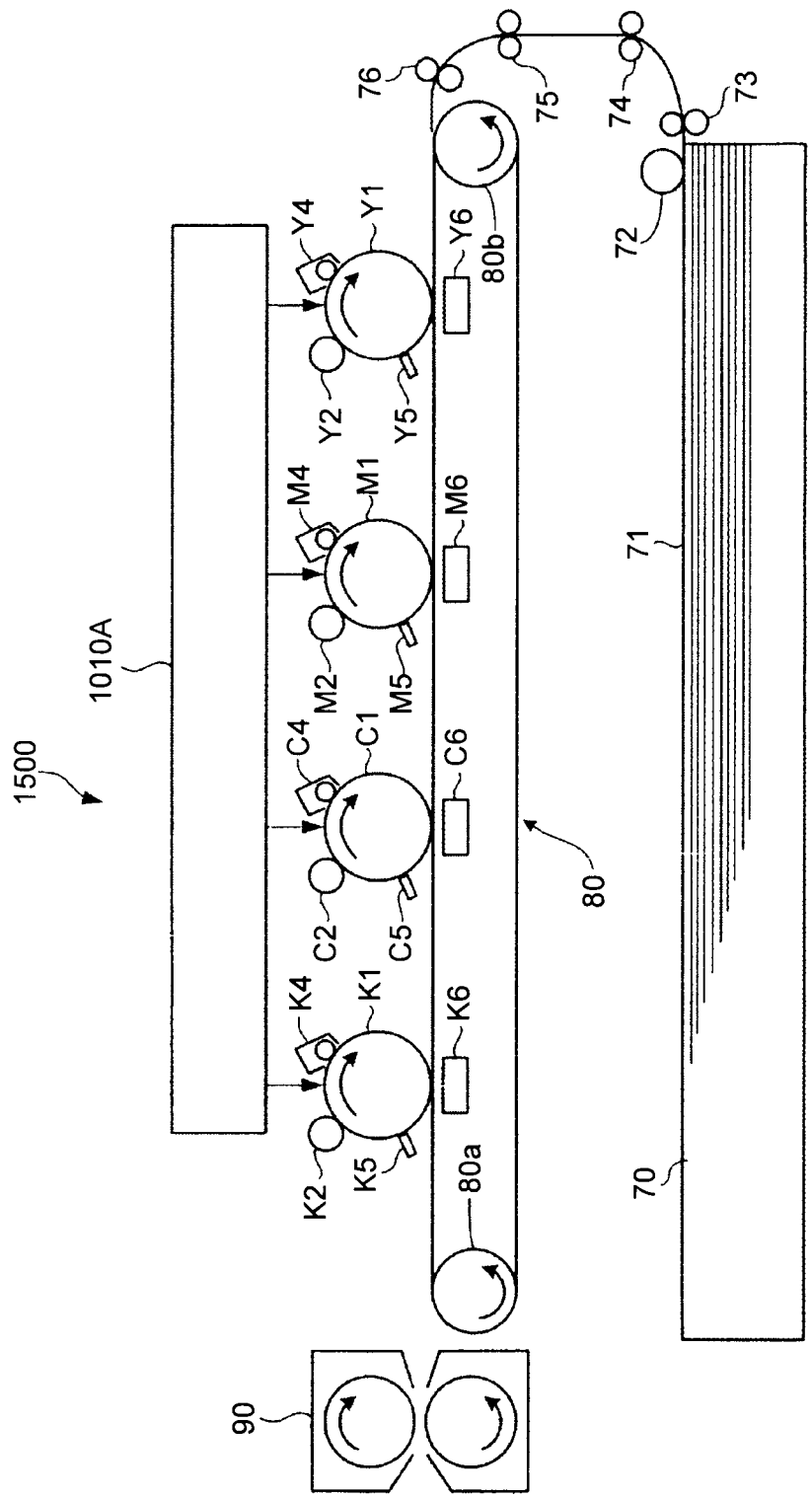
FIG. 9 is a diagram for explaining an example of a schematic configuration of a color image forming apparatus equipped with a plurality of optical scanning devices according to the present invention.

FIG. 9 is a diagram illustrating a tandem color image forming apparatus 1500 including a plurality of image forming units; the tandem color image forming apparatus 1500 can form a color image.

The tandem color image forming apparatus 1500 includes a black (K) image forming unit including a photosensitive drum K1, a charger K2, a developing unit K4, a cleaning unit K5, and a transfer charging unit K6 for K color image, a cyan (C) image forming unit including a photosensitive drum C1, a charger C2, a developing unit C4, a cleaning unit C5, and a transfer charging unit C6 for C color image, a magenta (M) image forming unit including a photosensitive drum M1, a charger M2, a developing unit M4, a cleaning unit M5, and a transfer charging unit M6 for M color image, a yellow (Y) image forming unit including a photosensitive drum Y1, a charger Y2, a developing unit Y4, a cleaning unit Y5, and a transfer charging unit Y6 for Y color image, an optical scanning device 1010A, a paper feed tray 70, a transfer belt 80, a fixing unit 90, and the like.

Figure 12:
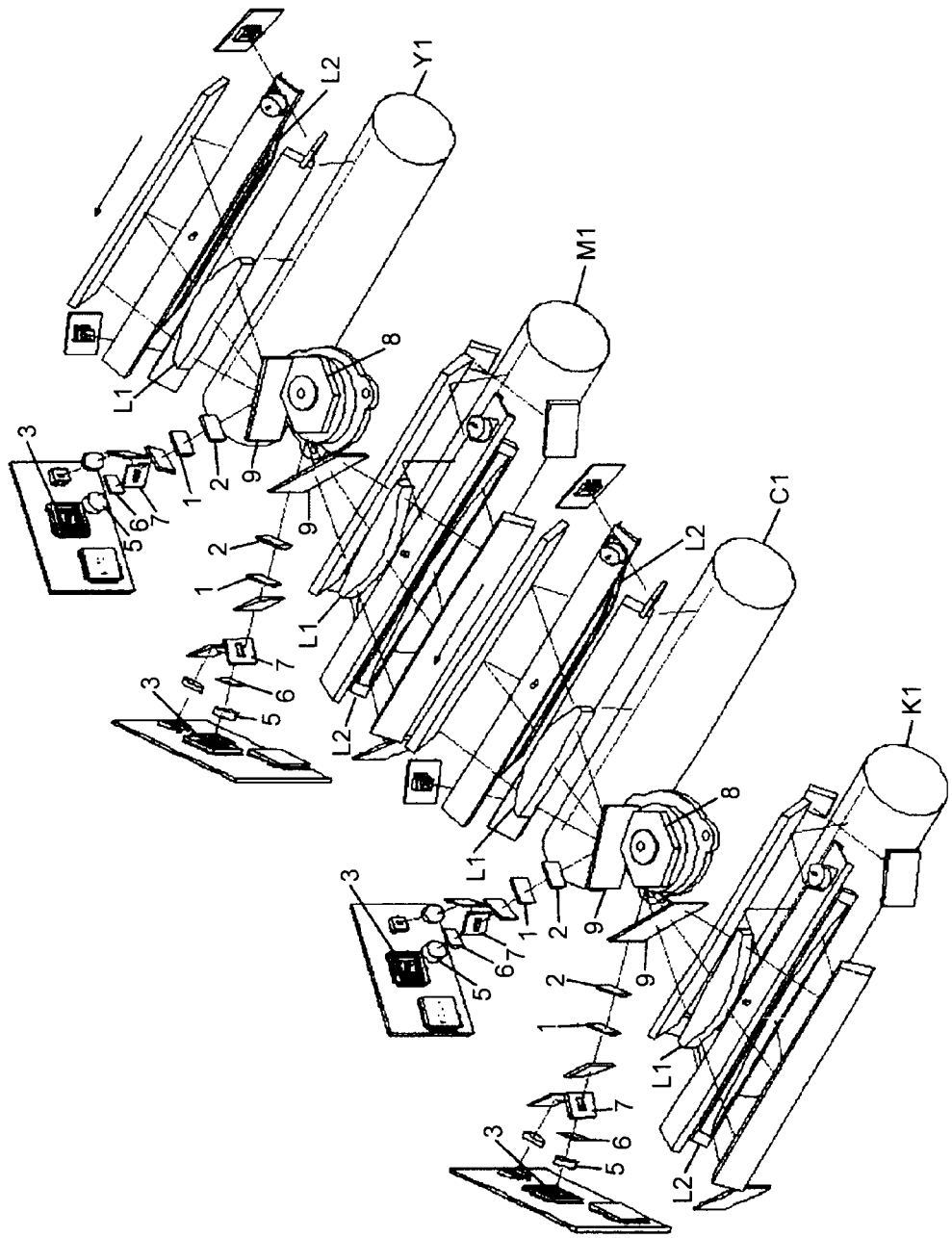
FIG. 12 is a diagram for explaining an example on the whole of a schematic configuration from the light source to photosensitive drums in the color image forming apparatus equipped with a plurality of optical scanning devices according to the present invention.

FIG. 12 is a schematic diagram illustrating a configurational example of an optical system from VCSELs included in the optical scanning device 1010A to the photosensitive drums (housing of an optical system is not illustrated in FIG. 12).

The optical scanning device 1010A illustrated in FIG. 12 includes four scanning optical systems having the same configuration as the optical system illustrated in FIGS. 1A and 1B and two polygon mirrors 8 as light deflecting units; one polygon mirror 8 is shared by two scanning optical systems. The optical scanning device 1010A includes, as the light source 3, four VCSELs for K, C, M, and Y color images, respectively.

A plurality of surface-emitting lasers in each of the VCSELs are two-dimensionally arranged, for example, as illustrated in FIG. 3. A light from the VCSEL for K color image is irradiated, via the scanning optical system for K color image, to a scanned area of the surface of the photosensitive drum K1; a light from the VCSEL for C color image is irradiated to the photosensitive drum C1 via the scanning optical system for C color image; a light from the VCSEL for M color image is irradiated to the photosensitive drum M1 via the scanning optical system for M color image; and a light from the VCSEL for Y color image is irradiated to the photosensitive drum Y1 via the scanning optical system for Y color image.

Each of the photosensitive drums K1, C1, M1, and Y1 rotates in a direction indicated by the arrow in FIG. 9, and, along the direction, the chargers K2, C2, M2, Y2, the developing units K4, C4, M4, Y4, the transfer charging units K6, C6, M6, Y6, and the cleaning units K5, C5, M5, Y5 are respectively arranged. Each of the chargers K2, C2, M2, Y2 uniformly charges the surface of the corresponding photosensitive drum among the photosensitive drums K1, C1, M1, Y1. The optical scanning device 1010A irradiates the respective surfaces of the photosensitive drums charged by the chargers K2, C2, M2, and Y2 with lights, and electrostatic latent images are formed on the photosensitive drums K1, C1, M1, and Y1. Then, the electrostatic latent images on the surfaces of the photosensitive drums K1, C1, M1, and Y1 are formed into K, C, M, and Y toner images by the developing units K4, C4, M4, and Y4, respectively.

In the paper tray 70, recording sheets 71, which are recording media, are contained. A paper feed roller 72 and a separation roller 73 are placed near the paper tray 70. The paper feed roller 72 and the separation roller 73 pick up recording sheets 71 from the paper tray 70 piece by piece, and feed the recording paper 71 to a pair of registration rollers 76 through conveying rollers 74 and 75. The pair of registration rollers 76 temporarily holds the recording sheet 71 picked up by the paper feed roller 72 and the separation roller 73, and feeds the recording sheet 71 onto the transfer belt 80 by keeping with the image forming timing of each image forming unit. Then, the recording paper 71 is conveyed toward a gap between each photosensitive drum and each transfer charging unit in association with the movement of the transfer belt 80.

Incidentally, in the example illustrated in FIG. 9, the Y, M, C, and K toner images on the photosensitive drums Y1, M1, C1, and K1 are sequentially transferred to the recording sheet 71 on the transfer belt 80 in the order of Y, M, C, K, by the transfer charging units Y6, M6, C6, and K6, respectively, and finally, the transferred image is fixed on the recording sheet 71 by the fixing unit 90, and then the recording sheet 71 is discharged onto a paper discharge unit (not shown).

In a tandem color image forming apparatus as illustrated in FIG. 9, a color shift may occur by a manufacturing error, position error, or the like, of each component; however, the optical scanning device 1010A has a plurality of two-dimensionally arranged light-emitting units, so that the accuracy of correcting the color shift can be improved by selecting light-emitting units to be turned on.

In the optical scanning device according to the present invention, the refracting power of the second and third optical elements can be suppressed by adjusting the respective refracting powers of the both optical elements to be positive, so that an increase in diameter of an imaging spot and degradation of the shape of the imaging spot due to an assembly error of the optical elements can be prevented. Therefore, it is possible to form a well-shaped imaging spot on the scanned area. Furthermore, it is possible to bring the interval between scanning lines formed on the scanned area close to a desired value. Moreover, a deviation of the scanning-line interval can be reduced, and therefore, it is possible to reduce a variation of the scanning-line interval between scanning positions.

In the optical scanning device according to the present invention, it is possible to bring the interval between scanning lines formed on the scanned area close to a desired value.

In the optical scanning device according to the present invention, it is possible to reduce the number of adjusting processes in assembly of the optical system and is also possible to reduce man-hours needed to assemble the optical system.

In the optical scanning device according to the present invention, it is possible to reduce the sensitivity of a placement error of the optical element having a smaller refracting power out of the second and third optical elements. Therefore, it is possible to suppress degradation of the shape of an imaging spot on the scanned area, an increase in diameter of the imaging spot, and an increase in error of the interval between scanning lines which are associated with the placement error of the optical element having a smaller refracting power. Furthermore, it is possible to reduce the number of adjusting processes in assembly of the optical system and also possible to reduce man-hours needed to assemble the optical system.

In the optical scanning device according to the present invention, it is possible to reduce a deviation of the scanning-line interval between scanning positions of scanning lines formed on the scanned area. In other words, it is possible to reduce a variation of the scanning-line interval in the whole scanning area and bring the interval between scanning lines close to a desired interval.

In the optical scanning device according to the present invention, it is possible to reduce the sensitivity of a placement error of the optical element having a smaller refracting power out of the second and third optical elements. Therefore, it is possible to suppress an increase in deviation of the scanning-line interval between scanning positions due to the placement error of the optical element having a smaller refracting power. Furthermore, it is possible to reduce the number of adjusting processes in assembly of the optical system and is also possible to reduce man-hours needed to assemble the optical system.

In the optical scanning device according to the present invention, it is possible to suppress an increase in deviation of the scanning-line interval between scanning positions due to a placement error of the second and third optical elements. Furthermore, it is possible to reduce the number of adjusting processes in assembly of the optical system and is also possible to reduce man-hours needed to assemble the optical system.

In the optical scanning device according to the present invention, it is possible to reduce the sensitivity of a placement error of the lens having a smaller refracting power out of the second and third optical elements. Therefore, it is possible to suppress an increase in error of the interval between scanning lines due to the placement error of the lens having a smaller refracting power. Furthermore, it is possible to reduce the number of adjusting processes in assembly of the optical system and also possible to reduce man-hours needed to assemble the optical system.

In the optical scanning device according to the present invention, it is possible to suppress an increase in deviation of the scanning-line interval between scanning positions due to a placement error of the second and third optical elements. Furthermore, it is possible to reduce the number of adjusting processes in assembly of the optical system and also possible to reduce man-hours needed to assemble the optical system.

In the optical scanning device according to the present invention, a reflected return beam from the plane of incidence of the second optical element to the side of the light source is a divergent beam in a direction perpendicular to a deflection scanning direction, and therefore, in a case in which a laser light source is used, it is possible to prevent a laser oscillation state from becoming unstable due to the reflected return beam.

In the optical scanning device according to the present invention, in a case in which a two-dimensional-array light source having two-dimensionally arranged luminous points is used, it is possible to suppress degradation of the shape of an imaging spot on the scanned area, an increase in diameter of the imaging spot, an increase in error of the interval between scanning lines, and an increase in deviation of the scanning-line interval between scanning positions which are associated with a placement error of the lens. Furthermore, it is possible to reduce the number of adjusting processes in assembly of the optical system and is also possible to reduce man-hours needed to assemble the optical system.

In the optical scanning device according to the present invention, in a case in which a surface-emitting laser array (a VCSEL) is used as an example of a two-dimensional-array light source, it is possible to suppress degradation of the shape of an imaging spot on the scanned area, an increase in diameter of the imaging spot, an increase in error of the interval between scanning lines, and an increase in deviation of the scanning-line interval between scanning positions which are associated with a placement error of the lens. Furthermore, it is possible to reduce the number of adjusting processes in assembly of the optical system and is also possible to reduce man-hours needed to assemble the optical system.

In the optical scanning device according to the present invention, in a case in which a one-dimensional-array light source having one-dimensionally arranged luminous points is used, it is possible to suppress degradation of the shape of an imaging spot on the scanned area, an increase in diameter of the imaging spot, an increase in error of the interval between scanning lines, and an increase in deviation of the scanning-line interval between scanning positions which are associated with a placement error of the lens. Furthermore, it is possible to reduce the number of adjusting processes in assembly of the optical system and is also possible to reduce man-hours needed to assemble the optical system.

In the optical scanning device according to the present invention, in a case in which an edge-emitting semiconductor laser array (an LD array) is used as an example of a one-dimensional-array light source, it is possible to suppress degradation of the shape of an imaging spot on the scanned area, an increase in diameter of the imaging spot, an increase in error of the interval between scanning lines, and an increase in deviation of the scanning-line interval between scanning positions which are associated with a placement error of the lens. Furthermore, it is possible to reduce the number of adjusting processes in assembly of the optical system and is also possible to reduce man-hours needed to assemble the optical system.

In the image forming apparatus including the image forming unit according to the present invention, it is possible to form a higher-quality image.

In the image forming apparatus including the plurality of image forming units according to the present invention, it is possible to reduce a color shift of different color images in formation of a color image. Therefore, also in color image formation, it is possible to form a high-quality color image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source having a plurality of luminous points;
a light deflecting unit that deflects and scans a plurality of beams emitted from the light source;
a pre-deflection optical system that is arranged anterior to the light deflecting unit along a beam path, and adjusts the shape of a plurality of beams emitted from the light source and then focuses the beams roughly to a deflecting surface of the light deflecting unit as a linear image extending in a deflection scanning direction; and
a scanning optical system that focuses the beams deflected and scanned by the deflecting surface of the light deflecting unit onto a scanned area, wherein
the pre-deflection optical system includes:
a first optical element that adjusts the shape of a plurality of beams emitted from the light source; and
a second and third optical elements that are arranged such that the second optical element is arranged closer to the light source than the third optical element is, both of the second and third optical elements having no refracting power in the deflection scanning direction and having positive refracting power only in a direction perpendicular to the deflection scanning direction,
an interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction,
the second and third optical elements form a zoom lens and are adjacent to one another along the beam path, without any optical element disposed between the second and third optical elements, so that the beams emitted from the light source pass through the second optical element and subsequently pass through the third optical element, and
when an interval between scanning lines at a scanning center of scanning lines formed on the scanned area from beams emitted from two most alienated luminous points in the deflection scanning direction out of the plurality of luminous points of the light source is denoted by PC, a variation in the scanning-line interval PC caused by displacement of any one of the second and third optical elements due to rotation by an angle $\Delta\gamma$ around the optical axis of the pre-deflection optical system is denoted by $\Delta PC(\Delta\gamma)$, $\Delta PC(\Delta\gamma)$ at the scanning center caused by displacement of any one of the second and third optical elements having larger refracting power in the direction perpendicular to the deflection scanning direction due to rotation by the angle $\Delta\gamma$ around the optical axis is denoted by $\Delta PCM(\Delta\gamma)$, and $\Delta PC(\Delta\gamma)$ at the scanning center caused by displacement of the other optical element having smaller refracting power in the direction perpendicular to the deflection scanning direction due to rotation by the angle $\Delta\gamma$ around the optical axis is denoted by $\Delta PCm(\Delta\gamma)$, the following inequality is satisfied:

$$\Delta PCM(\Delta\gamma)/\Delta PCm(\Delta\gamma) \geq 2.5.$$

2. The optical scanning device according to claim 1, wherein the interval between scanning lines is adjusted by displacement of any one of the second and third optical elements around the optical axis of the pre-deflection optical system.

3. The optical scanning device according to claim 1, wherein any one of the second and third optical elements having smaller refracting power in the direction perpendicular to the deflection scanning direction is subject to adjustment of the displacement in the direction of the optical axis only.

4. The optical scanning device according to claim 1, wherein
when refracting power of any one of the second and third optical elements having larger refracting power in the direction perpendicular to the deflection scanning direction is denoted by PM, and refracting power of the other optical element is denoted by PS, PM/PS≥2.5 is satisfied.

5. The optical scanning device according to claim 1, wherein
when an interval between scanning lines formed from two most alienated imaging spots in the deflection scanning direction and the direction perpendicular to the deflection scanning direction out of a plurality of imaging spots, on the scanned area, which are formed from the beams emitted from the plurality of luminous points of the light source is denoted by P, a variation in the scanning-line interval P due to displacement $\Delta Z$ of any one of the second and third optical elements in the direction perpendicular to the deflection scanning direction is denoted by $\Delta P(\Delta Z)$, $\Delta P(\Delta Z)$ at the scanning start position is denoted by $\Delta Ps(\Delta Z)$, and $\Delta P(\Delta Z)$ at the scanning end position is denoted by $\Delta Pe(\Delta Z)$, a product $\Delta Ps(\Delta Z) \times \Delta Pe(\Delta Z)$ is negative.

6. The optical scanning device according to claim 5, wherein
when $\Delta P(\Delta Z)$ at the scanning start position due to displacement $\Delta Z$ of any one of the second and third optical elements having larger refracting power in the direction perpendicular to the deflection scanning direction is denoted by $\Delta PMs(\Delta Z)$, $\Delta P(\Delta Z)$ at the scanning end position due to displacement $\Delta Z$ of any one of the second and third optical elements having larger refracting power in the direction perpendicular to the deflection scanning direction is denoted by $\Delta PMe(\Delta Z)$, $\Delta P(\Delta Z)$ at the scanning start position due to displacement $\Delta Z$ of the other optical element having smaller refracting power in the direction perpendicular to the deflection scanning direction is denoted by $\Delta Pms(\Delta Z)$, and $\Delta P(\Delta Z)$ at the scanning end position due to displacement $\Delta Z$ of the other optical element having smaller refracting power in the direction perpendicular to the deflection scanning direction is denoted by $\Delta Pme(\Delta Z)$, the following inequality is satisfied:

$$|\Delta PMs(\Delta Z) - \Delta PMe(\Delta Z)|/|\Delta Pms(\Delta Z) - \Delta Pme(\Delta Z)| \geq 2.5.$$

7. The optical scanning device according to claim 6, wherein
when the second and third optical elements are replaced by a single optical element having the same refracting power as an optical element including the second and third optical elements, $\Delta P(\Delta Z)$ at the scanning start position due to displacement $\Delta Z$ of the single optical element in the direction perpendicular to the deflection scanning direction is denoted by $\Delta POs(\Delta Z)$, and $\Delta P(\Delta Z)$ at the scanning end position due to displacement $\Delta Z$ of the single optical element in the direction perpendicular to the deflection scanning direction is denoted by $\Delta POe(\Delta Z)$, the following inequalities are satisfied:

$$|\Delta POs(\Delta Z) - \Delta POe(\Delta Z)| > |\Delta PMs(\Delta Z) - \Delta PMe(\Delta Z)| > |\Delta Pms(\Delta Z) - \Delta Pme(\Delta Z)|.$$

8. The optical scanning device according to claim 1, wherein
when the second and third optical elements are replaced by a single optical element having the same refracting power as an optical element including the second and third optical elements, $\Delta PC(\Delta \gamma)$ at the scanning center caused by displacement of the single optical element due to rotation by the angle $\Delta \gamma$ around the optical axis is denoted by $\Delta PCO(\Delta \gamma)$, the following inequalities are satisfied:

$$|\Delta PCO(\Delta \gamma)| > |\Delta PCM(\Delta \gamma)| > |\Delta PCm(\Delta \gamma)|.$$

9. The optical scanning device according to claim 1, wherein the plane of incidence of the second optical element in the direction perpendicular to the deflection scanning direction is a convex surface on the side of the light source.

10. The optical scanning device according to claim 1, wherein the light source is a two-dimensional-array light source in which a plurality of one-dimensional arrays, consisting of a plurality of luminous points that are one-dimensionally arranged at a predetermined interval, are arranged at a predetermined interval.

11. The optical scanning device according to claim 10, wherein the two-dimensional-array light source is a surface-emitting laser array.

12. The optical scanning device according to claim 1, wherein the light source is an array light source having an array of a plurality of luminous points which are one-dimensionally arranged at a predetermined interval.

13. The optical scanning device according to claim 12, wherein the array light source is an edge-emitting semiconductor laser array.

14. An image forming apparatus comprising:
an image forming unit that includes an image carrier, a charging unit for charging the surface of the image carrier, an optical scanning device for forming an electrostatic latent image by exposing the surface of the image carrier charged by the charging unit to a light, and a developing unit for forming a toner image by transferring toner to the electrostatic latent image on the image carrier;
a transfer unit that transfers the toner image formed on the image carrier onto a recording medium; and
a fixing unit that fixes the toner image on the recording medium, wherein
the optical scanning device including:
a light source having a plurality of luminous points;
a light deflecting unit that deflects and scans a plurality of beams emitted from the light source;
a pre-deflection optical system that is arranged anterior to the light deflecting unit along a beam path, and adjusts the shape of a plurality of beams emitted from the light source and then focuses the beams roughly to a deflecting surface of the light deflecting unit as a linear image extending in a deflection scanning direction; and
a scanning optical system that focuses the beams deflected and scanned by the deflecting surface of the light deflecting unit onto a scanned area, wherein the pre-deflection optical system includes:
a first optical element that adjusts the shape of a plurality of beams emitted from the light source; and a second and third optical elements that are arranged such that the second optical element is arranged closer to the light source than the third optical element is, both of the second and third optical elements having no refracting power in the deflection scanning direction and having positive refracting power only in a direction perpendicular to the deflection scanning direction, an interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction, the second and third optical elements form a zoom lens and are adjacent to one another along the beam path, without any optical element disposed between the second and third optical elements, so that the beams emitted from the light source pass through the second optical element and subsequently pass through the third optical element, and when an interval between scanning lines at a scanning center of scanning lines formed on the scanned area from beams emitted from two most alienated luminous points in the deflection scanning direction out of the plurality of luminous points of the light source is denoted by PC, a variation in the scanning-line interval PC caused by displacement of any one of the second and third optical elements due to rotation by an angle $\Delta\gamma$ around the optical axis of the pre-deflection optical system is denoted by $\Delta PC(\Delta\gamma)$, $\Delta PC(\Delta\gamma)$ at the scanning center caused by displacement of any one of the second and third optical elements having larger refracting power in the direction perpendicular to the deflection scanning direction due to rotation by the angle $\Delta\gamma$ around the optical axis is denoted by $\Delta PCM(\Delta\gamma)$, and $\Delta PC(\Delta\gamma)$ at the scanning center caused by displacement of the other optical element having smaller refracting power in the direction perpendicular to the deflection scanning direction due to rotation by the angle $\Delta\gamma$ around the optical axis is denoted by $\Delta PCm(\Delta\gamma)$, the following inequality is satisfied:

$\Delta PCM(\Delta\gamma)/\Delta PCm(\Delta\gamma) \geq 2.5$.

15. An image forming apparatus comprising:
a plurality of image forming units, each of the image forming units including an image carrier, a charging unit for charging the surface of the image carrier, an optical scanning device for forming an electrostatic latent image by exposing the surface of the image carrier charged by the charging unit to a light, and a developing unit for forming a toner image by transferring toner to the electrostatic latent image on the image carrier;
a transfer unit that transfers the toner images formed on the respective image carriers of the plurality of image forming units onto a recording medium; and
a fixing unit that fixes the toner images on the recording medium, wherein
the optical scanning device comprising:
    a light source having a plurality of luminous points;
    a light deflecting unit that deflects and scans a plurality of beams emitted from the light source;
    a pre-deflection optical system that is arranged anterior to the light deflecting unit along a beam path, and adjusts the shape of a plurality of beams emitted from the light source and then focuses the beams roughly to a deflecting surface of the light deflecting unit as a linear image extending in a deflection scanning direction; and
    a scanning optical system that focuses the beams deflected and scanned by the deflecting surface of the light deflecting unit onto a scanned area, wherein the pre-deflection optical system includes:
    a first optical element that adjusts the shape of a plurality of beams emitted from the light source; and
    a second and third optical elements that are arranged such that the second optical element is arranged closer to the light source than the third optical element is, both of the second and third optical elements having no refracting power in the deflection scanning direction and having positive refracting power only in a direction perpendicular to the deflection scanning direction, an interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction, the second and third optical elements form a zoom lens and are adjacent to one another along the beam path, without any optical element disposed between the second and third optical elements, so that the beams emitted from the light source pass through the second optical element and subsequently pass through the third optical element, and when an interval between scanning lines at a scanning center of scanning lines formed on the scanned area from beams emitted from two most alienated luminous points in the deflection scanning direction out of the plurality of luminous points of the light source is denoted by PC, a variation in the scanning-line interval PC caused by displacement of any one of the second and third optical elements due to rotation by an angle $\Delta\gamma$ around the optical axis of the pre-deflection optical system is denoted by $\Delta PC(\Delta\gamma)$, $\Delta PC(\Delta\gamma)$ at the scanning center caused by displacement of any one of the second and third optical elements having larger refracting power in the direction perpendicular to the deflection scanning direction due to rotation by the angle $\Delta\gamma$ around the optical axis is denoted by $\Delta PCM(\Delta\gamma)$, and $\Delta PC(\Delta\gamma)$ at the scanning center caused by displacement of the other optical element having smaller refracting power in the direction perpendicular to the deflection scanning direction due to rotation by the angle $\Delta\gamma$ around the optical axis is denoted by $\Delta PCm(\Delta\gamma)$, the following inequality is satisfied:

$\Delta PCM(\Delta\gamma)/\Delta PCm(\Delta\gamma) \geq 2.5$.

16. An optical scanning method, comprising:
deflecting and scanning a plurality of beams emitted from a light source having a plurality of luminous points;
adjusting, via a pre-deflection optical system, the shape of the plurality of the beams emitted from the light source, the pre-deflection optical system being arranged anterior to the light deflecting unit along a beam path;
focusing, via the pre-deflection optical system, the plurality of the beams roughly to a deflecting surface of the light deflecting unit as a linear image extending in a deflection scanning direction;

focusing, via a scanning optical system, the plurality of the beams deflected and scanned by the deflecting surface of the light deflecting unit onto a scanned area, wherein the pre-deflection optical system includes:
- a first optical element that adjusts the shape of a plurality of beams emitted from the light source; and
- a second and third optical elements that are arranged such that the second optical element is arranged closer to the light source than the third optical element is, both of the second and third optical elements having no refracting power in the deflection scanning direction and having positive refracting power only in a direction perpendicular to the deflection scanning direction, an interval between scanning lines formed on the scanned area and a deviation of the scanning-line interval between scanning positions are adjusted by displacement of the second and third optical elements in a direction of an optical axis of the pre-deflection optical system and displacement of at least one of the second and third optical elements in the direction perpendicular to the deflection scanning direction, the second and third optical elements form a zoom lens and are adjacent to one another along the beam path, without any optical element disposed between the second and third optical elements, so that the beams emitted from the light source pass through the second optical element and subsequently pass through the third optical element, and when an interval between scanning lines at a scanning center of scanning lines formed on the scanned area from beams emitted from two most alienated luminous points in the deflection scanning direction out of the plurality of luminous points of the light source is denoted by PC, a variation in the scanning-line interval PC caused by displacement of any one of the second and third optical elements due to rotation by an angle $\Delta\gamma$ around the optical axis of the pre-deflection optical system is denoted by $\Delta PC(\Delta\gamma)$, $\Delta PC(\Delta\gamma)$ at the scanning center caused by displacement of any one of the second and third optical elements having larger refracting power in the direction perpendicular to the deflection scanning direction due to rotation by the angle $\Delta\gamma$ around the optical axis is denoted by $\Delta PCM(\Delta\gamma)$, and $\Delta PC(\Delta\gamma)$ at the scanning center caused by displacement of the other optical element having smaller refracting power in the direction perpendicular to the deflection scanning direction due to rotation by the angle $\Delta\gamma$ around the optical axis is denoted by $\Delta PCm(\Delta\gamma)$, the following inequality is satisfied:

$\Delta PCM(\Delta\gamma)/\Delta PCm(\Delta\gamma) \geq 2.5$.

* * * * *